United States Patent
Streubel et al.

(10) Patent No.: US 7,556,273 B2
(45) Date of Patent: Jul. 7, 2009

(54) CONTROL ARM STRUCTURE FOR WHEEL SUSPENSIONS OF MOTOR VEHICLES, AND METHOD OF MAKING SUCH A CONTROL ARM STRUCTURE

(75) Inventors: Wolfgang Streubel, Detmold (DE); Armin Zuber, Meckesheim (DE); Wolfram Linnig, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 421 days.

(21) Appl. No.: 11/346,598

(22) Filed: Feb. 2, 2006

(65) Prior Publication Data
US 2006/0175786 A1 Aug. 10, 2006

(30) Foreign Application Priority Data
Feb. 2, 2005 (DE) .................... 10 2005 004 917

(51) Int. Cl.
*B60G 3/02* (2006.01)
*B60G 7/00* (2006.01)
(52) U.S. Cl. ............... 280/124.133; 428/223; 29/897.2; 264/261; 264/279; 52/638; 52/644; 52/309.16; 403/269; 403/267
(58) Field of Classification Search .......... 280/124.133, 280/124.134; 29/897.2; 264/261, 279; 52/638, 52/644, 309.16; 428/223; 403/269, 267
See application file for complete search history.

(56) References Cited

U.S. PATENT DOCUMENTS

| | | | | |
|---|---|---|---|---|
| 4,556,234 A | * | 12/1985 | Mahnig et al. | 280/124.134 |
| 5,163,603 A | * | 11/1992 | Richart | 228/141.1 |
| 5,190,803 A | | 3/1993 | Goldbach et al. | |
| 5,322,317 A | * | 6/1994 | Kusaka et al. | 280/124.134 |
| 5,662,348 A | * | 9/1997 | Kusama et al. | 280/124.134 |
| 6,358,603 B1 | * | 3/2002 | Bache | 428/323 |
| 6,572,126 B2 | * | 6/2003 | Tunzini | 280/124.134 |
| 6,749,360 B2 | * | 6/2004 | Abels | 403/381 |
| 6,905,129 B2 | * | 6/2005 | Runte et al. | 280/124.134 |
| 7,364,176 B2 | * | 4/2008 | Saitoh et al. | 280/124.13 |
| 2002/0000705 A1 | * | 1/2002 | Tunzini | 280/124.134 |
| 2003/0034625 A1 | * | 2/2003 | Runte et al. | 280/124.134 |
| 2003/0070387 A1 | | 4/2003 | Klocke et al. | |
| 2004/0131418 A1 | | 7/2004 | Budde et al. | |
| 2006/0099365 A1 | * | 5/2006 | Sasai et al. | 428/35.7 |

FOREIGN PATENT DOCUMENTS

JP 02204112 A * 8/1990
JP 05162522 A * 6/1993

* cited by examiner

*Primary Examiner*—John Q. Nguyen
*Assistant Examiner*—Karen Amores
(74) *Attorney, Agent, or Firm*—Henry M. Feiereisen; Ursula B. Day

(57) ABSTRACT

In a method of making a control arm for a wheel suspension of a motor vehicle a blank of steel material having a tensile strength of at least 800 MPa is shaped, using a sheet metal forming process, into a shell body having a center web and plural flank portions extending from the center web in a same direction. The flank portions are connected by a latticed reinforcement made of plastic, without application of a heat treatment process.

7 Claims, 1 Drawing Sheet

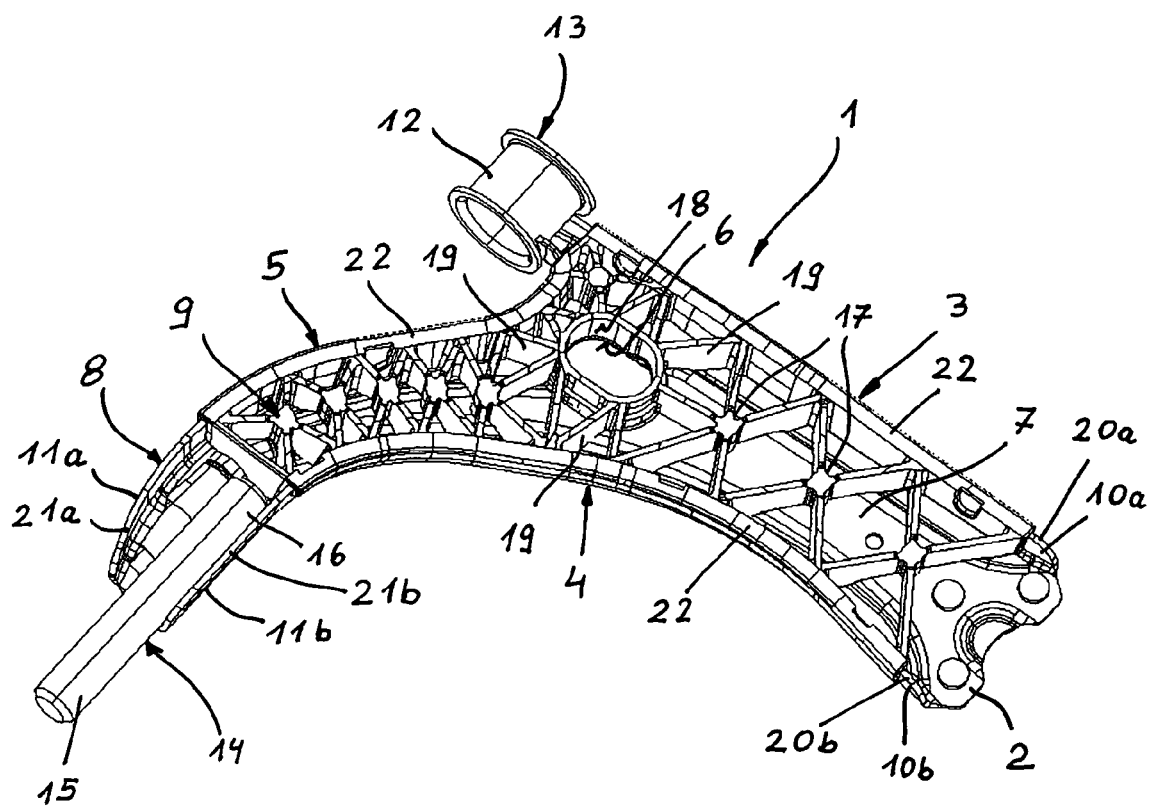

CONTROL ARM STRUCTURE FOR WHEEL SUSPENSIONS OF MOTOR VEHICLES, AND METHOD OF MAKING SUCH A CONTROL ARM STRUCTURE

CROSS-REFERENCES TO RELATED APPLICATIONS

This application claims the priority of German Patent Application, Ser. No. 10 2005 004 917.6, filed Feb. 2, 2005, pursuant to 35 U.S.C. 119(a)-(d), the content of which is incorporated herein by reference.

BACKGROUND OF THE INVENTION

The present invention relates, in general, to a control arm structure for wheel suspensions of motor vehicles, and to a method of making such a control arm structure.

Nothing in the following discussion of the state of the art is to be construed as an admission of prior art.

U.S. Pat. No. 5,190,803, issued Mar. 2, 1993, discloses a lightweight structure having a shell-shaped base body which has an interior accommodating reinforcing ribs made from injected-on plastic. Anchors are provided at the connecting points between the base body and the reinforcing ribs to enhance the buckling stability of the base body of steel sheet as well torsional stiffness.

U.S. Patent. Application Publication No. 2004/0131418, published Jul. 8, 2004, describes a force strut brace of a chassis of a passenger car or utility vehicle for the non-positive connection between a chassis and a wheel carrier. The force strut brace includes an elongated basic body and at least two end-side mount supports for introducing and leading out forces. The basic body is composed of a plurality of elements made of plastic and metal, wherein the connection between the metal elements and the plastic elements is realized by a deformation of a part of the plastic elements.

U.S. Patent. Application Publication No. 2003/0070387, published Apr. 17, 2003, describes a composite structure made of at least three profiles, whereby at least two profiles have a free end abutting a further profile, or engage within one another. Attached in the area of connection of the profiles is at least one reinforcing element in form-fitting engagement with the profiles. The profiles are connected to one by means of thermoplastic material in the area of the connection and include terminal indentations which are embraced by the reinforcing element.

Chassis components such as front axle carrier or rear axle carrier, twist beam rear axle, wishbone etc, are normally made of lightweight metal material, typically steel material, having a sufficient ductility to allow the necessary forming processes for realizing the desired final configurations. A high ductility in the relevant processing states runs, however, counter to the desired high mechanical strength. High-strength materials are suitable to reduce the weight of the chassis components, resulting in less fuel consumption of a motor vehicle and enhanced riding comfort as unsprung chassis masses are reduced.

In order to reduce the weight of chassis components as low as possible, the use of steel material with highest possible strength is desired. This poses a problem because the ductility decreases proportionally with an increase in strength of the steel material, rendering the steel material difficult to shape and thus requiring complicated heat treatments to achieve the necessary shaping ductility. Steel material with a tensile strength of more than 800 MPa can be shaped to a desired final configuration with desired high-strength properties, only when delivered in soft state, which requires however special thermal hardening after the shaping operation, or when delivered at high temperature with subsequent final hardening. These additional steps adversely affect manufacturing costs of complex chassis components with variable functional properties.

It would therefore be desirable and advantageous to provide an improved method of making a control arm structure for a wheel suspension of a motor vehicle, to obviate prior art shortcomings and to allow application of steel materials having high strength and low ductility.

It would also be desirable and advantageous to provide an improved control arm structure which can be made of steel materials having high strength and low ductility while still being reliable in operation.

SUMMARY OF THE INVENTION

According to one aspect of the present invention, a method of making a control arm for a wheel suspension of a motor vehicle includes the steps of providing a blank of steel material having a tensile strength of at least 800 MPa, shaping the blank using a sheet metal forming process into a shell body having a center web and plural flank portions extending from the center web in a same direction, and interconnecting the flank portions by a latticed reinforcement made of plastic without application of a heat treatment process.

As a result, the shell body can be made of high-strength steel material, while having low ductility potential, and can serve merely as support frame for the plastic latticed reinforcement that connects the flank portions. The present invention resolves prior art problems by providing a combination of high-strength materials with a latticed reinforcement of plastic, thereby realizing a control arm structure that has sufficient strength but at the same time is of reduced weight. The shell body represents the support frame for the latticed reinforcement and thus can be made of relative simple starting elements which are modestly shaped in particular and made of high-strength or super high strength steel materials and which are of intentionally simple geometry and little degree of deformation. Only the combination of high-strength steel material of the shell body with a comparably relatively soft latticed reinforcement of plastic completes the geometry and final operativeness of a control arm structure.

Steel materials are used here having a tensile strength of at least 800 MPa. Of course, steel materials of even greater tensile strength of at least 1000 MPa or even above 1200 MPa may be used. By reducing the degree of deformation, the slight ductility of these materials is taken into account, so that the need for a subsequent heat treatment to achieve a final hardness for example can be eliminated. As a consequence, the latticed reinforcement can be connected to the shell body without subsequent heat treatment so that the latticed reinforcement can be pre-manufactured as separate component and coupled by a separate connection step to the shell body. An example of a separate connection step may involve a clipping of the latticed reinforcements onto the shell body.

Of course, the latticed reinforcement may also be directly injected onto the shell body. This may be realized, for example, by providing the shell body with openings which are filled with plastic of the latticed reinforcement to thereby connect the latticed reinforcement in form-fitting manner to the flank portions of the shell body.

In general, the latticed reinforcement may also be coupled as separate component by means of an injection-molding process with the shell body. Injection molding does not involve a separate manufacture of the latticed reinforcement but involves merely a connection between the shell body and the latticed reinforcement. It is also conceivable, to glue the latticed reinforcement to the shell body.

Material selection and concrete shape depend primarily on the tension patterns that can be expected in the control arm structure. An example for plastic includes in particular polyamide, especially glass fiber reinforced polyamide, e.g. PA6GF. The material for the latticed reinforcement should also be selected in such a way that not only the shell body is capable of absorbing bending torque or torsional moment but also the latticed reinforcement should be able, despite the use of relatively soft plastic, to positively impact the overall stiffness characteristics of the control arm structure, especially as far as resistance to bending and torsional moments are concerned. Therefore, opposing flank portions of the shell body are interconnected by the latticed reinforcement, and struts may at least partially be provided in the shell body, which is generally U-shaped in cross section, so as to convert, in a mechanical sense, the open profile to a closed profile. Overall, the control arm structure according to the invention is as lightweight as possible and as stable in shape as possible.

Since the control arm structure is made not only by means of a sheet metal forming process but involves also an injection process, additional components which abut the shell body may be connected in this production step. In other words, profiled components may be provided on the shell body whereby the profiled components may be made of a material different than the material for the latticed reinforcement. These profiled components may be encapsulated by injection molding at the same time the latticed reinforcements are injected on for connection to the shell body. When made of a same material as the latticed reinforcements, the profiled components can be formed directly, when the latticed reinforcements are injected on.

According to another feature of the present invention, the shell body has a surface which may be coated, at least partially, with an outer layer of plastic for protecting the shell body against impacting rocks. Suitably, the plastic for the outer layer is the same as the plastic for the latticed reinforcement. Of course, other plastics may be applied for the outer layer, especially those of slight strength, such as polypropylene (PP).

According to another aspect of the present invention, a control arm structure for a wheel suspension of a motor vehicle, includes a shell body made through a sheet metal forming process and having a center web, plural flank portions extending from the center web in a same direction, and a latticed reinforcement made of plastic and interconnecting the flank portions, with the shell body having a tensile strength of at least 800 MPa and including a leading control arm and a trailing control arm, with an area of the trailing arm having a tensile strength which is greater than a tensile strength in an area of the leading control arm.

According to another feature of the present invention, the shell body may be made of steel material having a tensile strength of 1200 MPa.

According to another feature of the present invention, the latticed reinforcement may be injected onto the shell body.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIG. 1 shows a top perspective view of a control arm structure according to the present invention for use as a rear axle carrier.

DETAILED DESCRIPTION OF PREFERRED EMBODIMENTS

The depicted embodiment is to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a control arm structure according to the present invention, generally designated by reference numeral 1. The control arm structure 1 approximates an L-shaped configuration and includes three support regions. On the right-hand side of FIG. 1, there is a first support region 2 which is constructed with a socket of a ball-shaped coupling, not shown in detail, for connection to a hub carrier of a road wheel of a motor vehicle. The support region 2 is part of a leading control arm 3 which is connected in one piece via an intermediate portion 4 to a trailing control arm 5. The intermediate portion 4 is formed with a throughhole 6 which traverses a center web 7 extending from the leading control arm 3 to the trailing control arm 5.

The control arm structure 1 is a hybrid structure composed of a shell body 8 of high-strength or super high-strength steel with a tensile strength of at least 800 MPa and made through a sheet metal forming process. Connected to the shell body 8 is a latticed reinforcement 9. The shell body 8 includes the center web 7 and flank portions 10a, 10b, 11a, 11b of the leading and trailing control arms 3, 5, respectively, with the flank portions 10a, 10b, 11a, 11b extending form the center web 7. The flank portions 10a, 10b, 11a, 11b also extend across the intermediate portion 4 and gradually connect into one another. The flank portions 10a, 11a of the leading control arm 3 and the trailing control arm 5, respectively, are connected to a metallic cylindrical sleeve 12 which forms the second support region 13. The control arm structure 1 is swingably mounted by the second support region 13 to a chassis of a motor vehicle. A third support region 14 is formed by a bearing pin 15 disposed at the end of the trailing control arm 5. The bearing pin 15 has one end 16 received in the shell body 8 in the area of the trailing control arm 5 and projects out beyond the shell body 8.

The latticed reinforcement 9 extends from the end 16 of the bearing pin 15 along the entire trailing control arm 5, intermediate portion 4 into the leading control arm 3. The latticed reinforcement 9 is realized by crossing ribs, with their intersections 17 disposed in midsection between the respective flank portions 10a, 10b of the leading control arm 3 and between the respective flank portions 11a, 11b of the trailing control arm 5. The intersections 17 are positioned on an imaginary center line between the flank portions 10a, 10b, 11a, 11b at a slighter distance relative to one another in the area of the trailing control arm 5 than in the area of the leading control arm 3. The distance between two intersections 17 in the area of the leading control arm 5 is approximately twice the distance between two intersections 17 in the area of the trailing control arm 3. As a result, the stiffness of the latticed reinforcement 9 is greater in the area of the trailing control arm 3 than in the area of the leading control arm 5.

The throughhole 6 in the intermediate 4 has a contour of an elongate hole with slight length dimension and has a wall 18 which is part of the latticed reinforcement 9. Several struts 19 extend from the flank portions 10a, 10b of the leading control arm 3 as well as from the flank portions 11a, 11b of the trailing control arm 5 to the wall 18 of the throughhole 6. Forces are thus transmitted via the wall 18 of the throughhole 6 to the connected struts 19. Several intersections of the struts 19 that are connected to the wall 18 are located in the wall 18. The wall 18 may be connected, especially injected on, at a peripheral projection of the throughhole 6.

As shown in FIG. 1, the flank portions 10a, 10b have upper length edges 20a, 20b, and the flank portions 11, 11b have upper length edges 21a, 21b, whereby the length edges 20a, 20b, 21a, 21b are embraced by a thickened rim area 22 of the latticed reinforcement 9.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A control arm structure for a wheel suspension of a motor vehicle, comprising a shell body made through a sheet forming process and including a center web, plural flank portions extending from the center web in a same direction, and a latticed reinforcement made of plastic and interconnecting the flank portions, said shell body having a tensile strength of at least 800 MPa and including a leading control arm and a trailing control arm, wherein the latticed reinforcement includes crossing ribs intersecting at intersections which are disposed on an imaginary center line between the flank portions and spaced from one another at a distance which is smaller in an area of the trailing control arm than in an area of the leading control arm, with the area of the trailing arm having a tensile strength which is greater than a tensile strength in the area of the leading control arm.

2. The control arm structure of claim 1, wherein the shell body is made of a steel material having a tensile strength of 1200 MPa.

3. The control arm structure of claim 1, wherein the latticed reinforcement is injected onto the shell body.

4. The control arm structure of claim 1, wherein the latticed reinforcement is made of polyamide.

5. The control arm structure of claim 1, wherein the latticed reinforcement is made of glass fiber reinforced polyamide.

6. The control arm structure of claim 1, wherein the latticed reinforcement is made of PA6GF.

7. The control arm structure of claim 1, wherein the distance between two intersections in the area of the leading control arm is approximately twice the distance between two intersections in the area of the trailing control arm.

* * * * *